(12) United States Patent
Archambeau et al.

(10) Patent No.: US 8,736,946 B2
(45) Date of Patent: May 27, 2014

(54) TRANSPARENT ELECTROCHROMIC SYSTEMS WITH A PLURALITY OF POLARISATION ELECTRODES

(75) Inventors: Samuel Archambeau, Charenton-le-Pont (FR); Claudine Biver, Charenton-le-Pont (FR); Christian Bovet, Charenton-le-Pont (FR); Jean-Paul Cano, Charenton-le-Pont (FR); Sandrine Duluard, Charenton-le-Pont (FR); Anthony Saugey, Charenton-le-Pont (FR)

(73) Assignee: Essilor International (Compagnie Generale d'Optique), Charenton-le-Pont (FR)

(*) Notice: Subject to any disclaimer, the term of this patent is extended or adjusted under 35 U.S.C. 154(b) by 69 days.

(21) Appl. No.: 13/498,107

(22) PCT Filed: Sep. 24, 2010

(86) PCT No.: PCT/FR2010/052013
§ 371 (c)(1),
(2), (4) Date: Mar. 23, 2012

(87) PCT Pub. No.: WO2011/036420
PCT Pub. Date: Mar. 31, 2011

(65) Prior Publication Data
US 2012/0307340 A1    Dec. 6, 2012

(30) Foreign Application Priority Data

Sep. 28, 2009  (FR) ................................. 09 56707

(51) Int. Cl.
*G02F 1/15* (2006.01)

(52) U.S. Cl.
CPC .................................. *G02F 1/1521* (2013.01)
USPC .......................................... 359/275; 359/265

(58) Field of Classification Search
CPC ......... G02F 1/1521; G02F 1/155; G02B 1/06;
G02B 3/12; G02B 3/14; G02B 26/004;
G02C 7/085
USPC .................. 359/265–267, 271, 273–275, 591;
296/77.1, 84.1, 96.19–96.22,
296/97.1–97.13
See application file for complete search history.

(56) References Cited

U.S. PATENT DOCUMENTS

| 4,212,518 A | 7/1980 | Imataki et al. |
| 4,218,120 A | 8/1980 | Kawamura et al. |
| 4,285,575 A * | 8/1981 | Imataki et al. ............... 359/273 |

(Continued)

FOREIGN PATENT DOCUMENTS

| JP | 59219723 A | 12/1984 |
| JP | 2006119344 A | 5/2006 |

*Primary Examiner* — Darryl J Collins
*Assistant Examiner* — Gary O'Neill
(74) *Attorney, Agent, or Firm* — Seed IP Law Group PLLC (57) ABSTRACT

The invention relates to transparent electrochromic systems which each include one pair of supply electrodes and at least one pair of polarization electrodes. The polarization electrodes prevent a reaction of mutual neutralization of the electroactive substances of the systems from causing unnecessary consumption of electric current. Said electrodes also prevent a neutralization reaction from limiting a lower value of light transmission of the systems. For this purpose, the polarization electrodes produce an electric field inside the systems, which attracts the electroactive substances that have already reacted with the supply electrodes to different areas.

18 Claims, 4 Drawing Sheets

(56) References Cited

U.S. PATENT DOCUMENTS

| | | |
|---|---|---|
| 5,142,407 A | 8/1992 | Varaprasad et al. |
| 6,020,987 A | 2/2000 | Baumann et al. |
| 6,950,220 B2 | 9/2005 | Abramson et al. |
| 2002/0005977 A1 | 1/2002 | Guarr et al. |
| 2002/0141221 A1 | 10/2002 | Chernobrod et al. |
| 2004/0241517 A1 | 12/2004 | Shinozaki et al. |
| 2004/0257633 A1* | 12/2004 | Agrawal et al. ............... 359/265 |
| 2005/0128560 A1 | 6/2005 | Vincent et al. |
| 2007/0109218 A1* | 5/2007 | Saito et al. ..................... 345/55 |
| 2009/0195883 A1 | 8/2009 | Archambeau et al. |
| 2012/0120477 A1 | 5/2012 | Biver et al. |

* cited by examiner

TRANSPARENT ELECTROCHROMIC SYSTEMS WITH A PLURALITY OF POLARISATION ELECTRODES

The present invention relates to transparent electrochromic systems with a plurality of polarisation electrodes, as well as electrochromic devices comprising such systems.

In a known manner, an electrochromic system is a transparent element the optical characteristics of light transmission of which can vary in response to an electric current applied between two supply terminals of the system. To this end, an electrochromic system usually comprises:

- two outer walls defining a closed volume, the system being transparent for a direction of gaze passing through the outer walls and the closed volume between two opposite sides;
- a liquid or gel contained in the closed volume;
- first and second electroactive substances distributed in the liquid or gel, with respective oxidation-reduction potential values that are different, at least some of the first and second electroactive substances having an optical effect that varies between an oxidised form and a reduced form of these substances; and
- a pair of transparent supply electrodes, intended to be connected respectively to two output terminals of a variable electrical source for supplying the system with electric current, so as to transfer electrons to or from at least some of the electroactive substances, in a reverse mode between the first and second electroactive substances at the same moment of operation of the system.

Within the framework of the present invention, by transparent element is meant an optical element that allows a user situated on one side of the element a clear view, through this element, of objects situated on another side of and at a distance from the element. In other words, an image of the object is formed on the retina of the user by the light that propagates over a first non-zero distance between the object and the transparent element, then passes through the transparent element and propagates over a second non-zero distance between the transparent element and an eye of the user. To this end, a light diffusion and/or diffraction caused by the optical element must be sufficiently low, so that the image of an object point through the transparent element is an image point and not a diffuse spot in the image that is perceived by the user.

Such an electrochromic system is intended to vary the light transmission value through this system, between a clear state for which the light transmission has a high value, and a dark state for which it has a low value. To this end, when a suitable electrical voltage is produced between the two supply electrodes by a source, the first and second electroactive substances are oxidised for one and simultaneously reduced for the other, respectively on the supply electrode that is connected to a positive terminal of the voltage source, and on the electrode that is connected to a negative terminal of the same voltage source. The thus-formed oxidised and reduced substances can then diffuse within the closed volume, and undergo mutual neutralisation when they meet. Such neutralisation results in a higher consumption of electric current. Simultaneously, owing to this neutralisation, the light transmission of the electrochromic system in the dark state can be limited to a saturation value greater than the value that would result from the concentrations of the electroactive substances. In other words, the mutual neutralisation of the electroactive substances can reduce the difference between the light transmission values of the system between the two states, clear and dark, also called the dynamics of the electrochromic system.

Moreover, once some of the electroactive substances have reacted on contact with one of the supply electrodes, they can remain close to this electrode and then limit the access of other electroactive substances that have not yet reacted to this same supply electrode. Slowing of the switching of the electrochromic system between its clear and dark states results. Such slowing is detrimental to the function and use of the system in a large number of applications.

In these circumstances, one of the objects of the invention consists in proposing structures of electrochromic systems in which the consumption of electric current is reduced.

Another object of the invention consists in proposing structures for electrochromic systems that make it possible to increase the switching dynamics.

Yet another object of the invention consists in proposing structures for electrochromic systems that have superior switching speeds.

Yet a further purpose of the invention consists in proposing electrochromic systems that are simple to produce.

The present invention thus proposes two electrochromic systems each constituting a solution to these technical problems. Each electrochromic system of the invention is of the type previously described. In particular, it is transparent in order to allow clear vision through the system.

In addition, in the systems of the invention, the two supply electrodes are together supported by a single one of the two outer walls of each of these systems.

A first electrochromic system proposed by the present invention comprises further a pair of first transparent polarisation electrodes, together supported by the other one of the two outer walls than that supporting the supply electrodes, without contact with these supply electrodes within the system. Moreover, these first polarisation electrodes are situated one by one opposite the supply electrodes, on either side of the closed volume in a direction perpendicular to the outer walls.

In this first system, each first polarisation electrode and the supply electrode that is situated opposite are intended to be further connected respectively to two output terminals of a second variable electrical source, with respective polarities that are identical at least at some moments of operation of the system, for the output terminals of the first and second electrical sources that are connected to a single one of the supply electrodes, these polarities being considered respectively with respect to the other output terminal of the corresponding electrical source.

A second electrochromic system that is proposed by the present invention similarly comprises the first polarisation electrodes pair, with an arrangement of these first polarisation electrodes that is identical to that of the first system of the invention above. But the second electrochromic system comprises further a second transparent polarisation electrodes pair, situated between the supply electrodes on the one hand and the outer wall supporting these supply electrodes on the other hand. In addition, the second polarisation electrodes are situated one by one in line with the supply electrodes along the direction perpendicular to the outer walls, without contact with these supply electrodes within the system.

In this second system, each of the first polarisation electrodes and the one of the second polarisation electrodes that is situated in line with this first polarisation electrode along the direction perpendicular to the outer walls, are intended to be connected respectively to two output terminals of a second variable electrical source. In addition, the output terminals of the first and second electrical sources that are connected respectively to the one of the supply electrodes and the one of the second polarisation electrodes that are situated in line with each other, have respective polarities that are identical at least at some moments of operation of the system, these polarities being considered respectively with respect to the other output terminal of the corresponding electrical source.

Generally, all the polarisation electrodes that are introduced by the invention are electrically isolated from each other within the electrochromic system, and isolated with respect to each supply electrode.

However, the first electrochromic system proposed by the invention can be deduced from the second, by joining together each supply electrode with that of the second polarisation electrode aligned therewith along the direction perpendicular to the outer walls. For this reason, the two systems overcome the same above-mentioned technical problems in the same way.

In the two electrochromic systems of the invention, an additional electrical source is provided for connecting each first polarisation electrode. Each system is therefore generally electrically connected to one or two electrical source(s) dedicated to its polarisation, in addition to the first electrical source that is dedicated to supplying the system with electric current. Unlike this first source, each electrical source that is dedicated to the polarisation applies an electrical voltage between two of the electrodes of the electrochromic system, but without delivering electric current to these electrodes.

In both cases, each second electrical source produces an electric field in the closed volume of the system containing the electroactive substances. This electric field attracts the substances that have been oxidised or reduced on one of the supply electrodes to the opposite side of the closed volume, more than the same substances before they have reacted on the same supply electrode. In this manner, access to the supply electrodes by the electroactive substances which will be oxidised or reduced is improved, increasing the switching speed of the system.

Moreover, the first electroactive substances that have been oxidised and the second electroactive substances that have been reduced, or vice-versa according to the present direction of switching of the electrochromic system, can be attracted to first polarisation electrodes that are different. They can thus be kept at a distance from each other, which limits their mutual neutralisation. The electricity consumption of the system and the saturation of its coloured state that would result from this neutralisation are thus avoided, or partially suppressed. In particular, the switching dynamics of the electrochromic systems are thus enhanced.

Such a separation of the oxidised and reduced forms of the electroactive substances that are formed during a single switching of the electrochromic system can be all the more effective as these forms have respective electric charges that are different, and in particular as the oxidised form of each electroactive substance has an electric charge that is greater than that of the reduced form of the other electroactive substance. In other words, the first electroactive substances in their oxidised form preferably each have an electric charge greater than or equal to the electric charge of each second electroactive substance in the reduced form thereof. Symmetrically, each second electroactive substance in its oxidised form preferably has an electric charge greater than or equal to that of each first reduced electroactive substance. For these comparisons the electric charges of the substances are considered in algebraic values for comparison between them. In this case, both switches, from the clear state to the dark state and vice-versa, are promoted by the invention. If the electric charge of the oxidised form of one of the two electroactive substances is greater than that of the reduced form of the other electroactive substance, for only one of the two states of the electrochromic system, this state is improved by the invention.

However, the attraction of some forms of the electroactive substances to one of the polarisation electrodes, compared with other electroactive substances in the opposite form, can result from the respective mobility behaviours of these substances when they have electric charges that are equal.

Nevertheless, the effect of the invention is even greater as the electric charge of the oxidised form of one of the electroactive substances is strictly greater than the electric charge of the reduced form of the other substance formed during a single switching.

Moreover, given that all the electrodes, supply and polarisation, are supported by the outer walls of the system, the latter is simple to manufacture. Each electrode may be produced in the form of a thin layer deposited on the corresponding outer wall, without the need for additional support elements within the electrochromic system. Moreover, the electrodes of a single pair may have identical patterns, each on the corresponding outer wall, so that a single mask can be used for each pair of electrodes in order to define these patterns.

In various embodiments of electrochromic systems according to the invention, the closed volume which contains the liquid or gel in which the electroactive substances are distributed may be divided into juxtaposed cells parallel to the outer walls. In this case, each cell contains a portion of the liquid or gel that is subjected to the electric effects, within this cell, of only one or of both electrodes of each pair.

An electrochromic system according to the invention may form at least a portion of many optical components, such as a spectacle eyeglass, a goggles eyeglass, an optical lens, a helmet visor, an aeroplane window, a glazing, etc.

Finally the invention also proposes electrochromic devices comprising:
  the first or second transparent electrochromic system such as described previously;
  the first variable electrical source, with the two output terminals of this first electrical source that are connected respectively to the supply electrodes, and which is capable of supplying the system with electric current by applying between its two supply electrodes an electrical voltage higher than the difference between the respective oxidation-reduction potential values of the first and second electroactive substances; and
  at least one second variable electrical source, with a first output terminal of this second electrical source that is connected to at least one of the first polarisation electrodes.

When the first electrochromic system proposed by the invention is used, a second output terminal of the second electrical source may be connected to the supply electrode that is situated opposite the first polarisation electrode to which the first output terminal of the same second electrical source is connected. In this case, the first output terminal of the second electrical source may be further connected to the other supply electrode than that to which the second output terminal of this second electrical source is connected. Simultaneously, the second output terminal of the second electrical source may further be connected to the other first polarisation electrode than that to which said first output terminal of said second electrical source is connected. The output terminals of the first and second electrical sources that are connected to a single one of the supply electrodes then have respective polarities that are identical at least at some moments of operation of the system, these polarities being considered respectively with respect to the other output terminal of the corresponding electrical source. An electrochromic device that operates with two electrical sources only is thus obtained.

A device having three electrical sources may also be formed with the first electrochromic system of the invention. To this end, a second output terminal of the second electrical source is connected to the supply electrode situated opposite the first polarisation electrode to which the first output terminal of this second electrical source is connected. The device thus comprises moreover a third variable electrical source, having a first output terminal connected to the other supply electrode than that to which the second output terminal of the second electrical source is connected, and a second output terminal connected to the other first polarisation electrode than that to which the first output terminal of the second electrical source is connected. In this case, the output terminals of the first and second or third electrical sources that are connected to a single one of the supply electrodes then have respective polarities that are identical at least at some moments of operation of the system, these polarities being considered respectively with respect to the other output terminal of the corresponding electrical source.

Similarly, devices having two or three electrical sources may be formed by using the second electrochromic system proposed by the invention. For the connections of the second and/or third electrical source(s), each supply electrode is replaced, with respect to the above-described connections for the first system of the invention, by the second polarisation electrode that is aligned therewith in the direction perpendicular to the outer walls.

Other features and advantages of the present invention will become apparent from the following description of non-limitative embodiments, with reference to the attached drawings, in which.

For reasons of clarity, the dimensions of the different elements represented in these figures do not correspond to actual dimensions and dimensional relationships. Moreover, identical references given on different figures denote identical elements, or those having identical functions.

However, the inner walls 12 have not been shown in FIGS. 2a, 2b, 4a and 4b, it being understood that they are optional for the whole invention, capable of being according to FIGS. 1a and 3a, or FIGS. 1b and 3b, in particular.

Moreover, by way of illustration, the systems that are now described are intended to form spectacle eyeglasses, but it is understood that they may form other transparent elements, in particular by suitably adapting the outer walls of these systems.

According to FIGS. 1a, 1b and 3a, 3b, an electrochromic system 100 contains two parallel outer walls 10 and 11, delimiting an inner volume V. The volume V is sealed closed, for example by using a peripheral seal, not shown. The outer walls 10 and 11 may be a flexible film, such as a polyethylene terephthalate (PET) film, a polycarbonate (PC) film or a polyimide film. Such a film may have a thickness $e_{11}$ of 50 µm (micrometer), in particular. The outer wall 10 may also be a spectacle eyeglass, in mineral, organic or hybrid material habitually used in the ophthalmic field.

All the supply and polarisation electrodes listed below are electrically isolated from each other within the system 100. They may be made of tin-doped indium oxide (ITO for indium-tin oxide) or fluorine-doped tin oxide ($SnO_2$:F). These electrodes may be deposited on the inner face of the corresponding wall 10, 11 in the form of patterned thin layers, with a layer thickness that may be comprised between 0.1 µm and 3 µm, for example.

The outer wall 10 supports two supply electrodes referenced 1 and 2. These electrodes 1 and 2 are in contact with a liquid or gel that is contained in the volume V. They may have any respective complementary patterns whatever, while remaining separated from each other by a gap I parallel to the outer wall 10. This gap I can ensure that the electrodes 1 and 2 are electrically isolated from each other. In particular, the electrodes 1 and 2 may have comb patterns, with comb teeth that extend with an alternating pitch that may be comprised between 50 µm and 1.5 mm (millimeter), for example. The gap I may have a width of 18 µm, for example.

The outer wall 11 supports two first polarisation electrodes referenced 3 and 4. These electrodes 3 and 4 are situated one by one opposite the electrodes 1 and 2, on either side of the volume V, along a direction D perpendicular to the outer walls 10 and 11. Thus, the electrode 3 is aligned with the electrode 1 along the direction D, and the electrode 4 is aligned with the electrode 2.

In all the electrochromic systems 100 according to the invention, each polarisation electrodes 3, 4 may be in contact with the liquid or gel contained in the volume V. Alternatively, at least one electrically insulating film may be arranged on the polarisation electrodes 3 and 4, between the latter and the volume V, in order to prevent contact between each of these polarisation electrodes 3, 4 and the liquid or gel. In all the Figures, such an insulating film is referenced 5 and is only represented on a portion of the corresponding systems 100, in order to show that this insulating film is not systematically present. When it is used, the film 5 may be of silica ($SiO_2$) with a thickness $e_5$ that is less than 0.1 µm, for example.

The thickness d of the volume V in the direction D may be 20 µm, for example.

The outer walls 10 and 11 as well as the electrodes 1 to 4 are transparent for light beams passing through the system 100 between two opposite sides of the latter, in particular parallel to the direction D.

The fluid medium that is enclosed in the volume V is a liquid or a gel, according to its composition. It contains the electroactive substances that are intended to be oxidised or reduced on the supply electrodes 1 and 2 during operation of the system 100. It may also contain other additives such as a solvent common to the electroactive substances, anti-UV agents, plasticisers, etc.

The electroactive substances that are contained in the volume V may be, by way of illustrative example:

N,N,N',N' tetramethyl-phenylenediamine, that has an oxidation-reduction potential value of approximately 0.2 V (volt) with respect to a saturated mercurous chloride reference electrode. It is colourless and electrically neutral in its reduced form, and blue with a positive electric charge in its oxidised form; and ethyl-anthraquinone, that has an oxidation-reduction potential value of approximately −1.5 V with respect to a saturated mercurous chloride electrode. It is colourless in its oxidised form and red in its reduced form. Moreover, the ethyl-anthraquinone molecule is neutral in its oxidised form, and negatively charged in its reduced form.

When there is zero voltage between the two supply electrodes 1 and 2, the first of these two substances is in its reduced form, and the second in its oxidised form, owing to their respective oxidation-reduction potential values. The electrochromic system is then in its clear state, with a high light transmission value, for example greater than 70%, preferably greater than 80%. When the voltage applied between the two supply electrodes 1 and 2 is higher than approximately 1.7 V, the N,N,N',N' tetramethyl-phenylenediamine is oxidised on contact with the one of these electrodes 1 and 2 that is connected to the positive output terminal of the source of electrical supply of the electrochromic system, and the ethyl-anthraquinone is reduced on contact with the other supply electrode that is connected to the negative output terminal of the same electrical source. The electrochromic system 100 then becomes absorbing with a blue colour. Its light transmission can then be less than 20%, for example, even less than 10%, as a function of the concentrations of the electroactive species in particular.

These two electroactive substances may be introduced into the volume V each with a concentration comprised between 0.001 and 1 mol.l$^{-1}$ (mole per liter), as a function of the desired light absorption level for the absorbing state of the electrochromic system 100. For example, the concentrations of the two abovementioned electroactive species may be equal to 0.2 mol.l$^{-1}$.

In particular embodiments of the invention, and optionally, the system 100 may further comprise a network of inner walls 12, forming a partition of the volume V into juxtaposed cells 13 parallel to the outer walls 10 and 11. The inner walls 12 are perpendicular to the outer walls 10 and 11, and divide the liquid or gel contained in the volume V into portions of liquid or gel that are respectively contained in the cells 13. The composition and the embodiment of the walls 12 are assumed to be known to a person skilled in the art and are not repeated here. For example, the walls 12 may each have a thickness that is greater than 0.1 µm, preferably comprised between 0.5 and 8 µm, and each cell 13 may have a dimension comprised between 50 µm and 1.5 mm for example, parallel to the outer walls 10 and 11. The cells 13 then form a tessellation of the electrochromic system 100, parallel to the walls 10 and 11, having any regular pattern whatever, for example hexagonal, or random or pseudo-random.

Figure 1A:
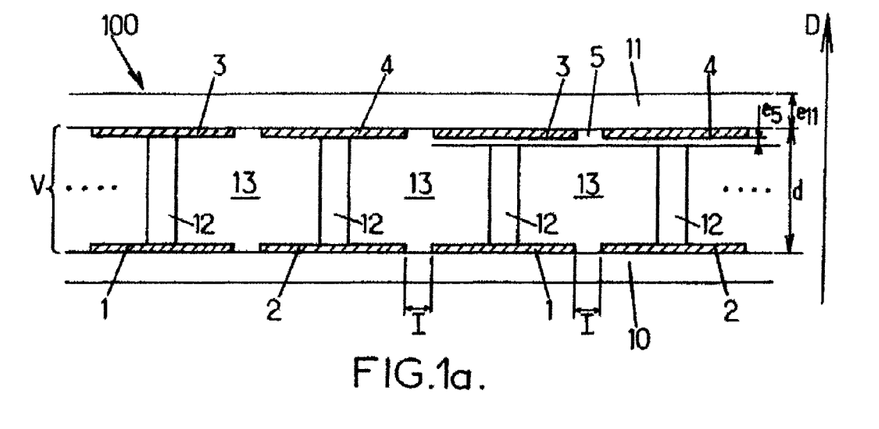
FIGS. 1a and 1b are sectional views of two first electrochromic systems according to the invention.

According to a first method of partitioning the volume V shown in FIG. 1a, the two supply electrodes 1 and 2 are each in contact with the liquid or gel contained in each cell 13, and the liquid or gel contained in each cell contains both the first and the second electroactive substances. Thus, the two electrodes 1 and 2 are in contact with the portions of liquid or gel of all the cells 13. According to an advantageous embodiment, some of the inner walls 12 can extend between the electrodes 1 and 3, and other inner walls 12 between the electrodes 2 and 4, with extensions of the electrodes on either side of each corresponding inner wall 12, parallel to the outer walls 10 and 11. Thus, each of the electrodes 1 to 4 extends continuously between adjacent cells 13, and each cell 13 can be supplied by the two electrodes 1 and 2, by the respective extensions of same within this cell.

Figure 1B:
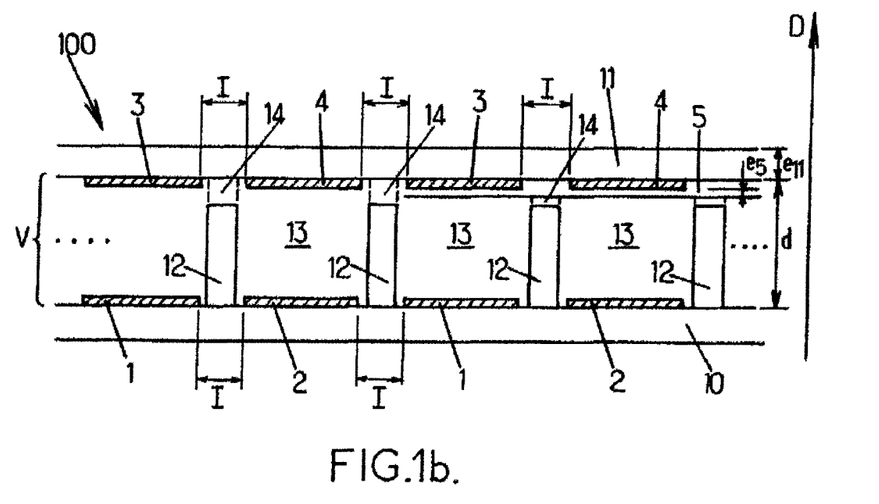

According to a second mode of partitioning the volume V shown in FIG. 1b, for at least some of the cells 13, a single one of the two supply electrodes 1 and 2 is in contact with the liquid or gel contained in each cell. In this case, a first cell 13 supplied by one of the electrodes 1 and 2 is adjacent to a second cell 13 supplied by the other electrode 1 or 2. According to a possible embodiment, some of the inner walls 12 may extend between the outer walls 10 and 11 at the level interelectrode separation gaps I in the direction D. Within the system 100, ion bridges 14 electrically connect neighbouring cells 13 that are supplied separately by the electrode 1 and the electrode 2. Such ion bridges may be produced by one of the methods habitually used in electrochemistry. For example, the ion bridges 14 may be situated at the ends of the inner walls 12, for example on the side of the outer wall 11. They may also be produced in the inner walls 12, in particular when the latter are permeable to ions of small sizes that are contained in the liquid or gel with the electroactive substances. These ion bridges 14 provide an electrical neutrality of the content of each cell 13 at each moment of operation of the system 100. They thus make it possible to keep the system 100 in any state whatsoever in a stationary manner.

When only one of the two supply electrodes 1 or 2 supply each cell 13 of the system 100, the liquid or gel being capable of containing first electroactive substances without second electroactive substances within the cells 13 that are supplied by one of these supply electrodes, and second electroactive substances without first electroactive substances within the cells 13 that are supplied by the other supply electrode. For example, for the method of partitioning the volume V of FIG. 1b, it is possible for those of the cells 13 that are supplied by the electrode 1 to contain only tetramethyl-phenylenediamine molecules, and those of the cells 13 that are supplied by the electrode 2 to contain only ethyl-anthraquinone molecules. In this case, the first switching of the system 100 after its production is carried out by connecting the electrode 1 to the positive output terminal of an electrical source and the electrode 2 to the negative output terminal of this source.

For the use of all the systems 100 that are described, a first variable electrical source 20 is electrically connected, by two current output terminals of this first source, to the supply electrodes 1 and 2. The source 20 is capable of producing between its output terminals, an electrical voltage that is greater than or equal to the difference between the respective oxidation-reduction potential values of the first and second electroactive substances. It then produces an electric current that passes through the system 100 between the electrodes 1 and 2. During switching of the system 100 from the clear state to the dark state, tetramethyl-phenylenediamine molecules are oxidised on contact with the one of the supply electrodes 1 and 2 that is connected to the positive output terminal of the source 20, and ethyl-anthraquinone molecules are reduced on contact with the other electrode 1 or 2 that is connected to the negative output terminal of the source 20. After the connexion of the source 20 shown in FIGS. 2a, 2b, 4a and 4b, the tetramethyl-phenylenediamine molecules are thus oxidised on the electrode 1 and the ethyl-anthraquinone molecules are reduced at the electrode 2. In order to return to the clear state, the polarity of the source 20 is reversed with respect to the supply electrodes 1 and 2. The tetramethyl-phenylenediamine molecules that have been oxidised are then reduced on the electrode 1, and the previously reduced ethyl-anthraquinone molecules are re-oxidised on the electrode 2.

The source 20 may be of the direct current source or pulse current source type.

Figure 2A:
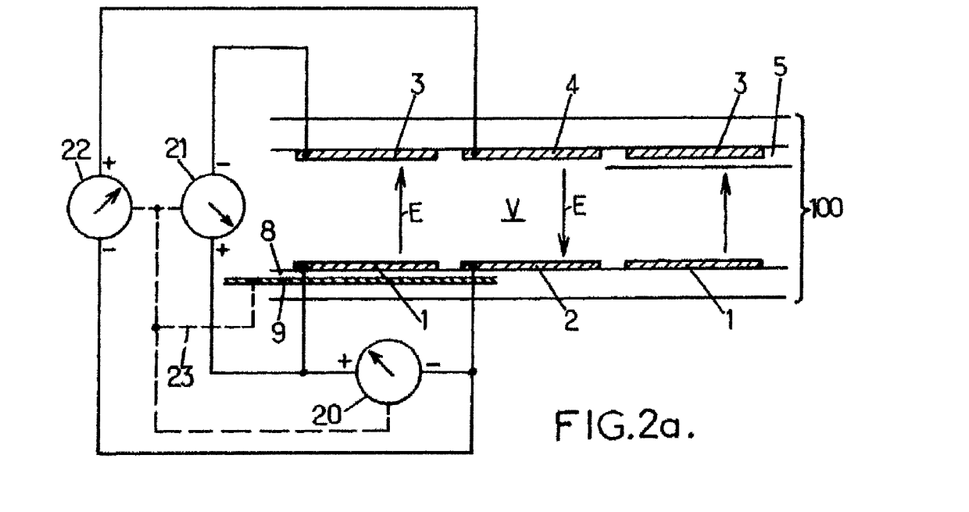
FIGS. 2a and 2b represent electrochromic devices comprising first systems according to FIGS. 2a and 2b, having respectively two and three electrical sources.

According to FIG. 2a, a second variable electrical source 21 may be electrically connected between the supply electrodes 1 and the polarisation electrodes 3. Simultaneously, a third variable electrical source 22 may be electrically connected between the supply electrodes 2 and the polarisation electrodes 4. Each source 21 or 22 is capable of producing an electrical voltage between the two electrodes of the system 100 to which it is connected, without delivering electric current. For this reason, the sources 21 and 22 are called polarisation sources. Therefore, each of them produces an electric field in the volume V, between the one of the supply electrodes 1 or 2 and the polarisation electrodes 3 or 4 that is situated opposite this supply electrode.

When the system 100 is switched, the respective polarities of the polarisation sources 21 and 22 are dependent on the polarity of the supply source 20. Thus during switching from the clear state to the dark state, the supply electrode 1 is connected to the positive output terminal of the source 21, in addition to the positive output terminal of the source 20. The polarisation electrode 3 is then connected to the negative output terminal of the source 21. Simultaneously, the supply electrode 2 is connected to the negative output terminal of the source 22, in addition to the negative output terminal of the source 20, and the polarisation electrode 4 is connected to the positive output terminal of the source 22. Under the effect of the electric field produced by the source 21 between the electrodes 1 and 3, the oxidised tetramethyl-phenylenediamine molecules that are positively charged, migrate from the electrode 1 to the electrode 3. This migration ensures an improved access of the supply electrode 1 to the tetramethyl-phenylenediamine molecules that have not yet reacted.

Similarly, the ethyl-anthraquinone molecules that are reduced on the supply electrode 2 during the colouration of the system 100, with a reduced negatively charged form, then migrate to the polarisation electrodes 4. Thus the oxidised and reduced forms of all the electroactive substances that are produced simultaneously on the supply electrodes 1 and 2 during switching of the system, remain apart from each other. Those that are oxidised remain close to the one of the polarisation electrodes 3 or 4 that is connected to the negative output terminal of one of the sources 21 or 22, and the electroactive substances that are reduced remain close to the other polarisation electrode 3 or 4, connected to the positive output terminal of the other source 21 or 22. Being thus separated spatially into different areas of the volume V, their mutual neutralisation is prevented. In all Figures, the arrows that are marked E within the volume V represent the orientations of the electric field that have just been described.

Thus according to the electric charge of the oxidised and reduced forms of the electroactive substances, use of the polarisation electrodes according to the invention achieves the following beneficial effects:
  attraction to the electrodes supplying the electrochromic system with electric current, for those electroactive substances that are electrically charged and intended to react on these electrodes during switching of the system;
  distancing with respect to the supply electrodes, for those electroactive substances that have already reacted on the supply electrodes, in order to improve access to these electrodes for the electroactive substances that have not yet reacted; and
  separation into different areas of the inner volume of the electrochromic systems, of the electroactive substances that have already reacted on the supply electrodes.

A higher switching speed of the electrochromic systems results from the first two effects. Moreover, the latter effect avoids the mutual neutralisation of the electroactive substances after having been oxidised or reduced on the supply electrodes. Thus, the additional consumption of electric current that would be caused by this mutual neutralisation is avoided. Likewise, it is possible to avoid saturation of the light transmission of the system in the dark state at a value greater than that corresponding to the concentrations of the electroactive substances, also due to the mutual neutralisation of the electroactive substances.

The improvement now described makes it possible for all mutual neutralisation of the electroactive species to be avoided completely. It is applicable when the volume V is divided into cells 13 that are each supplied by a single one of the two electrodes 1 or 2. In such a configuration of the system 100, some at least of the inner walls 12 may extend towards the outer wall 11 that supports the polarisation electrodes 3 and 4, along the direction D, until the cells 13 on the side of the outer wall 11 are closed. Such a closure of the cells 13 is adapted so that the electroactive substances that are close to the polarisation electrodes 3 and 4 cannot pass from a cell 13 to a neighbouring cell. However, it is simultaneously possible for ions of the smallest sizes to pass through these walls 12 close to the electrodes 3 and 4, in particular when an ion bridge 14 is provided at this site of the volume V.

Although the advantages of the invention have been described for switching the electrochromic system in the direction of its colouration, in the light of this description a person skilled in the art will know how to transpose them to the reverse case of switching of the system, from its dark state to its clear state. The same advantages are provided by the invention to switching in both directions.

According to the operation of the polarisation electrodes introduced by the invention, the electroactive substances are not oxidised or reduced on these electrodes. The use of the insulating film 5 ensures that no oxidation-reduction reaction can take place on the polarisation electrodes 3 and 4. Another method to this end consists of limiting the electrical voltages that are produced by the polarisation sources 21 and 22 such that they are less than the difference between the respective oxidation-reduction potential values of the first and second electroactive substances in absolute values.

According to another improvement of the devices according to FIG. 2a, the electrochromic systems used may further can comprise an additional transparent polarisation electrode 9, situated between the supply electrodes 1 and 2 on the one hand and the outer wall 10 on the other hand. This additional polarisation electrode 9 has no contact either with the supply electrodes 1 and 2, and with the liquid or gel contained in the volume V, and with the polarisation electrodes 3 and 4. For example, an intermediate layer 8 of an insulating material may be intercalated between the electrode 9 and the electrodes 1 and 2. The additional electrode 9 is intended to be connected to a reference terminal having electric potential. In particular, at least one of the sources 21 and 22 may have a reference potential terminal. The latter, and preferably respective reference potential terminals of the two sources 21 and 22, may then be electrically connected to the additional polarisation electrodes 9 by an additional connection 23. Optionally, the supply source 20 may also have a reference potential electrode connected by the connection 23. The electrode 9 provides an improved control over the distribution of the electrical potential within the volume V in its entirety, in particular at the level of the inter-electrode separation gaps I.

Figure 2B:
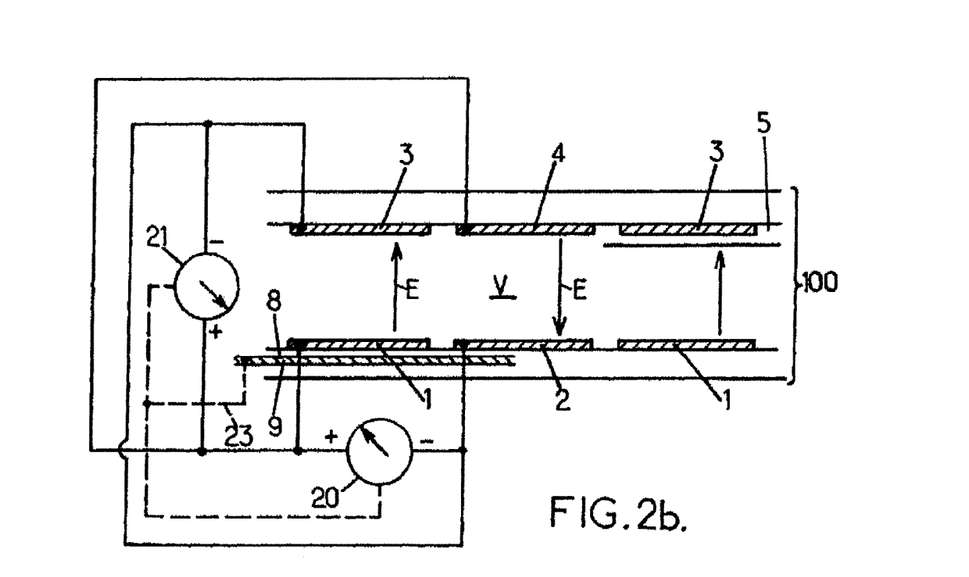

The device of FIG. 2b corresponds to that of FIG. 2a, with a single electric polarisation source that fulfils the functions of the two sources 21 and 22 of FIG. 2a. Thus, at a moment of operation of the device at which the supply electrode 1 is connected to the positive output terminal of the source 20 and the supply electrode 2 to the negative output terminal of the source 20, the single polarisation source, also referenced 21, is connected by its positive output terminal to the electrodes 1 and 4, and by its negative output terminal to the electrodes 2 and 3. The operation of the device is then identical to that described in relation to FIG. 2a.

Figure 3A:
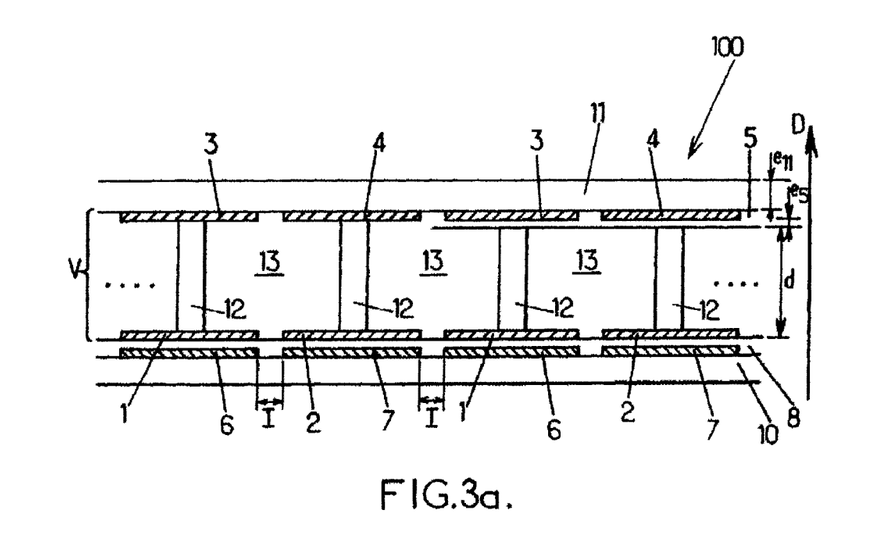
FIGS. 3a and 3b correspond respectively to FIGS. 1a and 1b, for two second electrochromic systems according to the invention.
Figure 3B:
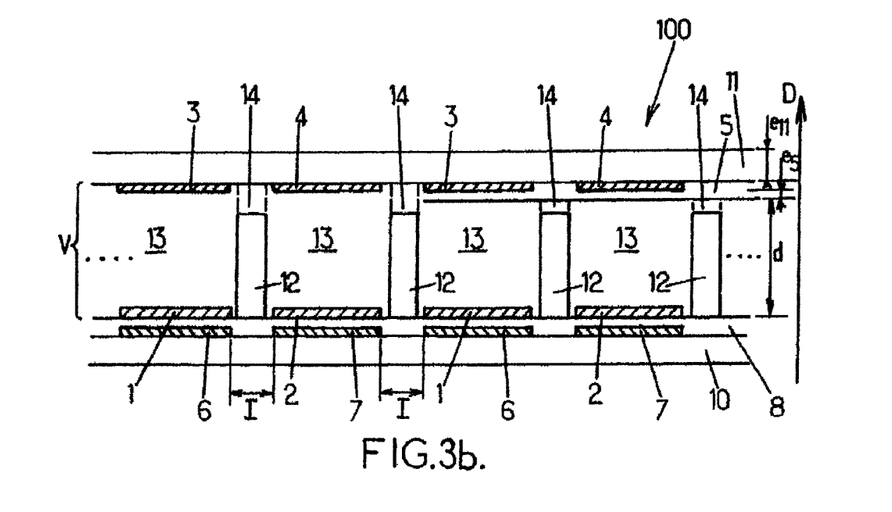

The electrochromic systems 100 of FIGS. 3a and 3b comprise all the elements of the systems of FIGS. 1a and 1b. In particular, they comprise the electrodes 3 and 4 that form a pair of first polarisation electrodes. But they include moreover a pair of second polarisation electrodes, referenced 6 and 7. The electrodes 6 and 7 are supported by the outer wall 10, like the supply electrodes 1 and 2, between the latter and the wall 10. The electrodes 6 and 7 may be electrically isolated with respect to the electrodes 1 and 2 by an intermediate layer 8 of an insulating material. The second polarisation electrodes 6 and 7 are moreover situated one by one in line with the supply electrodes 1 and 2, optionally with the same patterns on the outer wall 10. Thus the polarisation electrode 6 is situated below the supply electrode 1, along the oriented direction D, and the polarisation electrode 7 is situated below the supply electrode 2, along the same direction D. FIG. 3a shows such a system 100 with a partition of the volume V into juxtaposed cells such that each cell 13 is supplied simultaneously by the two electrodes 1 and 2. In the partition of FIG. 3b, each cell 13 is supplied by a single one of the two electrodes 1 and 2, with an alternation between these two supply electrodes between the neighbouring cells 13.

Figure 4A:
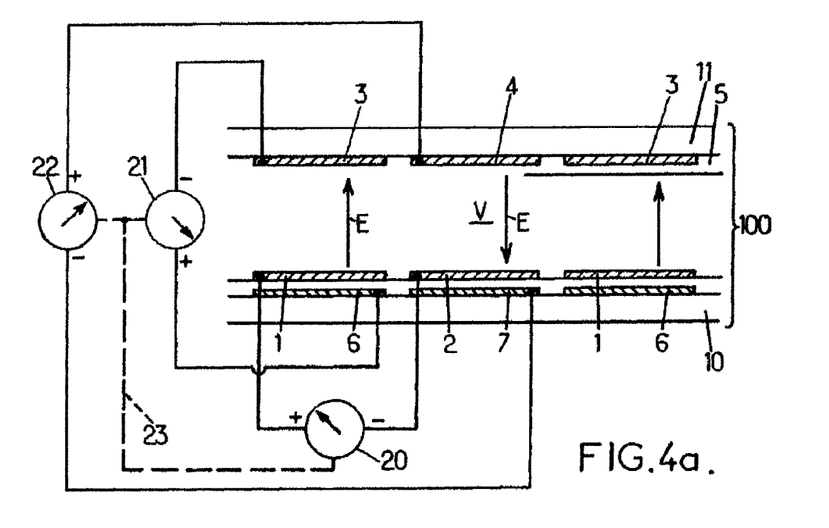
FIGS. 4a and 4b correspond respectively to FIGS. 2a and 2b for second systems of FIGS. 3a and 3b.

The device of FIG. 4a is formed by associating one of the electrochromic systems 100 of FIGS. 3a and 3b with three variable electrical sources. These sources are identical to the ones 20-22 previously introduced with reference to FIG. 2a, apart from the connections of the polarisation sources 21 and 22. The output terminals of the polarisation source 21 are now connected to the polarisation electrodes 3 and 6. The one of the output terminals of the source 21 that is positive is connected to the electrode 6 at a moment of operation of the device when the supply electrode 1 is itself connected to the positive output terminal of the source 20. The negative output terminal of the source 21 is then connected to the electrode 3. Simultaneously, the negative output terminal of the polarisation source 22 is connected to the polarisation electrodes 7, and the positive output terminal of the source 22 is connected to the electrode 4. The polarities of the two polarisation sources 21 and 22 are again reversed, following the changes of polarity of the supply source 20. A decoupling is thus obtained between the supply electrodes 1 and 2 on the one hand and the polarisation electrodes 6 and 7 on the other hand. However, the operation of the device is identical to that described in relation to FIG. 2a. The use of inner walls 12 that are sealed to electroactive substances when each cell 13 is supplied by a single one of the electrodes 1 and 2, the use of the insulating film 5 as well as the connection of respective reference potential terminals of the sources 20, 21 and 22 are also identical to those previously described.

Figure 4B:
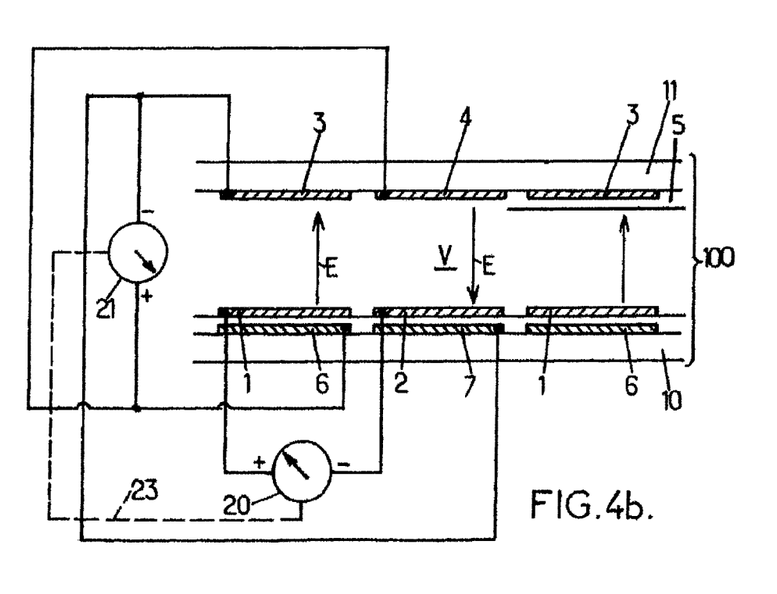

Finally, FIG. 4b shows the use of a system 100 according to FIGS. 3a and 3b with two electrical sources: the source 20 for supplying the system with electric current and a single polarisation source 21. This use can be deduced from that of FIG. 4a, in the same way as for FIGS. 2a and 2b.

It is understood that the invention may be reproduced by adapting features that have been mentioned by way of example, while retaining at least some of the advantages mentioned. In particular, the concentration values and/or dimensions of the elements of the electrochromic system may be modified for each application considered. Further ionic substances may also be added to the composition of the liquid or gel, in particular in order to increase its ionic conduction.

The invention claimed is:

1. A transparent electrochromic system, allowing clear vision through said system, and comprising:
   first and second outer walls defining a closed volume, the system being transparent for a direction of gaze passing through the outer walls and said closed volume between two opposite sides;
   a liquid or gel contained in the closed volume;
   first and second electroactive substances distributed in the liquid or gel, with respective oxidation-reduction potential values that are different, at least some of the first and second electroactive substances having an optical effect that varies between an oxidised form and a reduced form of said substances;
   a pair of transparent first and second supply electrodes, together supported by the first outer wall, and configured to be connected respectively to two output terminals of a first variable electrical source for supplying the system with electric current, so as to transfer electrons to or from at least some of the electroactive substances, in a reverse mode between said first and second electroactive substances at a same moment of operation of the system; and
   a pair of transparent first and second polarisation electrodes together supported by the second outer wall and having no contact with said supply electrodes within the system, said first polarisation electrode being situated opposite the first supply electrode and on an opposite side of the closed volume with respect to the first supply electrode along a direction perpendicular to the outer walls, and said second polarisation electrode being situated opposite the second supply electrode and on an opposite side of the closed volume with respect to the second supply electrode along a direction perpendicular to the outer walls,
   the first polarisation electrode and the first supply electrode being configured to be further connected respectively to two output terminals of a second variable electrical source, the output terminals of said first and second variable electrical sources that are connected to the first supply electrode being configured to have respective polarities that are identical at least at some moments of operation of the system, said polarities being considered respectively with respect to the other output terminal of the corresponding electrical source.

2. The system according to claim 1, further comprising a transparent third polarisation electrode situated between the supply electrodes on one hand and the first outer wall on the other hand, said third polarisation electrode having no contact with said supply electrodes and with the liquid or gel contained in the closed volume, and with said first and second polarisation electrodes, and being configured to be connected to a reference terminal having electrical potential.

3. A transparent electrochromic system, allowing a clear vision through said system, and comprising:
   first and second outer walls defining a closed volume, the system being transparent for a direction of gaze passing through the outer walls and said closed volume between two opposite sides;
   a liquid or gel contained in the closed volume;
   first and second electroactive substances distributed in the liquid or gel, with respective oxidation-reduction potential values that are different, at least some of the first and second electroactive substances having an optical effect that varies between an oxidised form and a reduced form of said substances;
   a pair of transparent supply electrodes, together supported by a the first outer wall, and configured to be connected respectively to two output terminals of a first variable electrical source for supplying the system with electric current, so as to transfer electrons to or from at least some of the electroactive substances, in a reverse mode between said first and second electroactive substances at a same moment of operation of the system;

a pair of transparent first and second polarisation electrodes together supported by the second outer wall and having no contact with said supply electrodes within the system, and said first and second polarisation electrodes being situated respectively opposite the first and second supply electrodes, and on and opposite side of the closed volume with respect to the supply electrodes in a direction perpendicular to the outer walls; and a pair of transparent third and fourth polarisation electrodes situated between the supply electrodes on one hand, and the first outer wall on the other hand, said third and fourth polarisation electrodes being situated respectively in line with the first and second supply electrodes along respective directions perpendicular to the outer walls with no contact with said supply electrodes within the system, said first and third polarisation electrodes being configured to be connected respectively to two output terminals of a second variable electrical source, the output terminals of said first and second variable electrical sources that are connected respectively to the first supply electrode and the third polarisation electrode being configured to have respectively polarities that are identical at least at some moments of operation of the system, said polarities being considered respectively with respect to the other output terminal of the corresponding electrical source.

4. The system according to claim 3, in which the first electroactive substances in the oxidised form of said first electroactive substances each have an electric charge greater than an electric charge of each second electroactive substance in the reduced form of said second electroactive substances.

5. The system according to claim 3, forming at least a portion of a spectacle eyeglass, a goggles eyeglass, an optical lens, a helmet visor, an aeroplane window or a glazing.

6. The system according to claim 3, in which the first and second polarisation electrodes are in contact with the liquid or gel contained in the closed volume.

7. The system according to claim 3, comprising at least one electrically insulating film arranged to prevent contact between the first and second polarisation electrodes and the liquid or gel contained in the closed volume.

8. The system according to claim 3, further comprising a network of inner walls forming a partition of the closed volume into cells that are juxtaposed parallel to the outer walls, said inner walls being perpendicular to said outer walls, and in which the supply electrodes are each in contact with the liquid or gel contained in a plurality of the cells, and the liquid or gel contained in each cell containing both the first and second electroactive substances.

9. The system according to claim 3, further comprising a network of inner walls forming a partition of the closed volume into cells that are juxtaposed parallel to the outer walls, said inner walls being perpendicular to said outer walls, and in which, for at least some of the cells, a single one of the supply electrodes is in contact with the liquid or gel contained in each cell, a first one of said cells that is supplied by the first supply electrode being adjacent to a second of said cells that is supplied by the second supply electrode with an ion bridge between said first and second cells.

10. The system according to claim 9, in which at least some of the inner walls extend towards the second outer wall, along a direction perpendicular to the outer walls, until closing said cells on the side of said outer wall to avoid the electroactive substances that are close to said first and second polarisation electrodes passing from one cell to a neighbouring cell.

11. The system according to claim 9, in which the liquid or gel in the first one of the cells contains first electroactive substances without second electroactive substances, and the liquid or gel in the second one of the cells contains second electroactive substances without first electroactive substances.

12. An electrochromic device comprising:
a transparent electrochromic system according to claim 1;
the first variable electrical source, with the two output terminals of said first variable electrical source including first and second output terminals connected respectively to the first and second supply electrodes, the first variable electrical source being configured to supply the system with electric current by applying between said supply electrodes an electric voltage that is greater than a difference between the respective oxidation-reduction potential values of the first and second electroactive substances; and
the second variable electrical source having a first output terminal connected to the first polarisation electrode.

13. The electrochromic device according to claim 12, in which:
a second output terminal of the second variable electrical source is connected to the first supply electrode,
the first output terminal of the second variable electrical source being further connected to the second supply electrode, and
the second output terminal of the second variable electrical source being further connected to the second polarisation electrode,
the first output terminals of said first and second electrical sources having respective polarities that are identical at least at some moments of operation of the system, said polarities being considered respectively with respect to the second output terminals of the corresponding electrical sources.

14. The electrochromic device according to claim 12, in which:
a second output terminal of the second variable electrical source is connected to the first supply electrode,
the device further comprising a third variable electrical source having a first output terminal connected to the second supply electrode, and a second output terminal connected to the second polarisation electrode,
the first output terminal of said first variable electrical source and the second output of the second variable electrical sources having respective polarities that are identical at least at some moments of operation of the system, said polarities being considered respectively with respect to the other output terminal of the corresponding electrical source.

15. The electrochromic device according to claim 13, in which:
the system includes a transparent third polarisation electrode situated between the supply electrodes on one hand and the first outer wall on the other hand, said third polarisation electrode having no contact with said supply electrodes and with the liquid or gel contained in the closed volume, and
at least one of the electrical sources has a reference terminal having an electric potential different from the output terminals of said electrical source, said reference terminal being connected to the third polarisation electrode.

16. An electrochromic device, comprising:
the electrochromic system according to claim 3;
the first variable electrical source, with the two output terminals of said first variable electrical source including first and second output terminals connected respectively to the first and second supply electrodes, the first variable electrical source being configured to supply the system with electric current by applying between said supply electrodes an electric voltage that is greater than a difference between the respective oxidation-reduction potential values of the first and second electroactive substances; and the second variable electrical source having a first output terminal connected to the first polarisation electrode, and a second output terminal connected to the third polarisation electrode, the first output terminal of said first variable electrical source and the second output terminal of the second variable electrical source having respective polarities that are identical at least at some moments of operation of the system, said polarities being considered respectively with respect to the other output terminal of the corresponding electrical source.

17. The electrochromic device according to claim 16, further comprising:

a third variable electrical source having a first output terminal connected to the fourth polarisation electrode, and a second output terminal connected to the second polarisation electrode, the second output terminal of said first electrical source and the first output terminal of the third variable electrical source having respective polarities that are identical at least at some moments of operation of the system, said polarities being considered respectively with respect to the other output terminal of the corresponding electrical source.

18. The electrochromic device according to claim 16, in which:

the first output terminal of the second variable electrical source is further connected to the fourth polarisation electrode, and the second output terminal of the second electrical source is further connected to the second polarisation electrode.

* * * * *